H. W. OLIVER, Jr.

DEVICE FOR OPERATING TUYERE STOPPERS.

No. 10,498. Reissued July 15, 1884.

Witnesses—

W. B. Corwin

J. K. Smith

Inventor—

Henry W. Oliver Jr by his attys

Bakewell & Kerr

N. PETERS, Photo-Lithographer, Washington, D.C.

UNITED STATES PATENT OFFICE.

HENRY W. OLIVER, JR., OF PITTSBURG, PENNSYLVANIA.

DEVICE FOR OPERATING TUYERE-STOPPERS.

SPECIFICATION forming part of Reissued Letters Patent No. 10,498, dated July 15, 1884.

Original No. 299,572, dated June 3, 1884. Application for reissue filed June 20, 1884.

*To all whom it may concern:*

Be it known that I, HENRY W. OLIVER, Jr., of Pittsburg, in the county of Allegheny and State of Pennsylvania, have invented a new and useful Improvement in Devices for Operating Tuyere-Stoppers; and I do hereby declare the following to be a full, clear, and exact description thereof.

My invention relates to that class of fixed converters or cupola-furnaces for treating molten metal known as "Clapp & Griffith's Converters," in which the tuyeres are provided with stoppers for regulating the blast, and for preventing the escape of the metal therethrough. These converters are usually of small size, so as to have a comparatively small quantity of metal above the tuyeres, and are used with a comparatively low-pressure blast.

The object of my invention is to obtain a simple, inexpensive, and efficient means for seating and unseating the stoppers, plugs, or valves simultaneously.

To enable others skilled in the art to make and use my invention, I will now describe it by reference to the accompanying drawings, in which—

Figure 1:
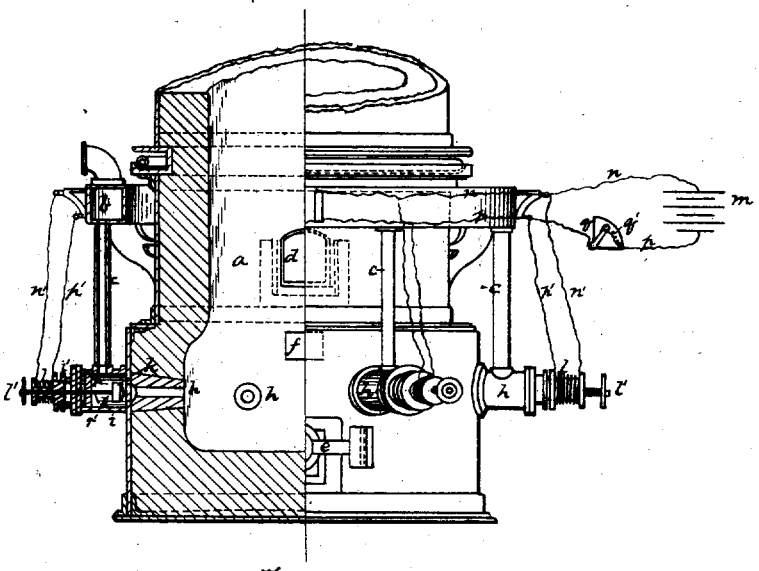
Figure 2:
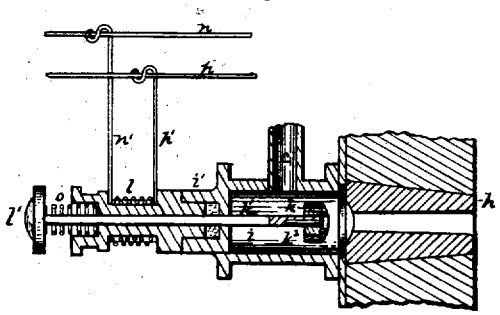

Figure 1 is a view of a converter provided with my improvement, partly in section. Fig. 2 is an enlarged sectional view of one of the tuyeres, showing a modification.

Like letters of reference indicate like parts in each.

The converter *a* is of the usual construction, being provided with a blast-main *b*, blast-pipes *c*, charging-hole *d*, metal tap-hole *e*, and cinder tap-hole *f*. The stoppers *h* are each provided with an external air chamber or tube, *i*, to which the blast-pipes *c* are connected, and with a stopper, *k*, which is operated by means of a stem, *k'*. Beyond the stuffing-box *i'* is an annular electro-magnet, *l*, through the bore of which the stem *k'* extends.

The outer end is provided with a suitable armature, *l'*. The wires *p' n'* of the magnet are connected to the main wires *p* and *n*, which extend from a primary battery, dynamo-electric machine, or other suitable source of generator of electricity, *m*. Each tuyere is provided with a similar magnet having similar connections; or, if desired, they may be connected in series. In Fig. 2 the armature is fitted with a suitable retracting-spring, *o*, which is of sufficient power to unseat the stopper against the pressure of the blast. In the main circuit of the generator *m* is a circuit-closer, *q*, by means of which the circuit is opened and closed to the magnets. A port, $k^2$, Fig. 2, communicating with the air-chamber *i* and the tuyere, extends through the stem and stopper, to admit a minute jet of air to the tuyeres when the stopper is closed, to prevent the molten metal from chilling in the tuyere.

Thus constructed, the operation, briefly stated, is as follows, viz: When it is desired to close the tuyere, the circuit is closed to the magnet. The passage of the current through the magnet-coils magnetizes its core, which attracts the armature *l'*, and thereby seats the stopper. The current continues to pass over the magnet and holds the stopper to its seat until the circuit is opened, when the spring *o* will draw the stopper back from its seat. The stoppers, being all provided with magnets having the same connections, will be operated simultaneously by moving the circuit-closer *q*, which, being provided with an adjustable resistance, *q'*, serves also to regulate the amount of current passing over the wires.

In Fig. 1 I show a piston, *r*, instead of the retracting-spring. The air-chamber *i* is made of uniform diameter back of the blast-pipe *c*, and the piston *r* is mounted on the stem *k*. An exhaust-port, *r'*, is provided. When the blast is admitted to the box *i*, it acts on the piston, and as the latter is of greater area than the back of the stopper, it is forced back by the blast, and the tuyere opened.

It will be apparent to those skilled in the art that the magnet may be applied to opening instead of closing the stoppers; also, that a helix and movable core may be substituted for the electro-magnet; also, that the electro-magnet or helix may not encircle the stopper-stem, but be arranged at the side, and its armature or core be connected with the stem. Other modifications or changes of position can be made, as will be understood.

I do not limit myself to the use of external stoppers, as it is apparent that I can operate internal stoppers as well; nor do I limit myself to reciprocating stoppers, because it is apparent that by connecting a radial armature or core to the stem the latter may be given a radial movement to operate a stopper sliding or turning laterally over the mouth of the tuyere.

My improvement is efficient, cheap, not liable to get out of order, and reduces the number of appliances on the exterior of the converter, and simplifies its construction.

I am aware that the valves in gas lighting and extinguishing apparatus have been operated by electro-magnets and helices; and I do not claim, broadly, the devices by which the stoppers in my application are operated. It is of great importance in the use of converters that the bulk, number, and arrangements of parts used for such purposes as actuating the tuyere-stoppers be as small, few, and simple as possible. This desideratum is pre-eminently obtained in my improvement, where the operating devices have no moving parts except the stem of the stopper, which in all cases must have an axial movement. The electric wire is easily applied, occupies but little room, is not in the way, and if so can easily be moved, and does not require frequent attention and repairs, so that the proper operation of the converter is not interfered with.

What I claim, and desire to secure by Letters Patent, is—

1. The combination of a converter or cupola-furnace provided with tuyeres, with the tuyere-stoppers and their stems or shafts and an electro-magnet or helix for closing or opening the stoppers, substantially as and for the purposes described.

2. The combination of a converter or cupola-furnace provided with tuyeres and external blast-chambers, with the tuyere-stoppers and their stems or shafts, an electro-magnet or helix for moving the stoppers in one direction, and devices for moving them in the other direction, substantially as and for the purposes described.

In witness whereof I have hereunto set my hand.

HENRY W. OLIVER, JR.

Witnesses:

THOMAS W. BAKEWELL,

THOMAS B. KERR.